United States Patent [19]

Ijichi et al.

[11] 4,021,391
[45] May 3, 1977

[54] PRESSURE-SENSITIVE ADHESIVE COMPOSITION

[75] Inventors: Ichiro Ijichi; Shigetoshi Kai; Hikaru Teranishi; Akira Morioka; Kazuyoshi Seki, all of Ibaraki, Japan

[73] Assignee: Nitto Electric Industrial Co., Ltd., Ibaraki, Japan

[22] Filed: Dec. 19, 1975

[21] Appl. No.: 642,636

[30] Foreign Application Priority Data

Dec. 11, 1974 Japan .............................. 49-142663

[52] U.S. Cl. .............................. 260/27 BB; 260/845
[51] Int. Cl.$^2$ ........................................ C08L 93/00
[58] Field of Search .......... 260/24, 18, 841, 27 BB, 260/845

[56] References Cited

UNITED STATES PATENTS

| | | | |
|---|---|---|---|
| 3,210,302 | 10/1965 | Bowell | 260/24 |
| 3,242,230 | 3/1966 | Habib | 260/24 |

OTHER PUBLICATIONS

Skeist, Handbook Of Adhesives, 1962, p. 338 relied on.

Primary Examiner—Lewis T. Jacobs
Assistant Examiner—William E. Parker
Attorney, Agent, or Firm—Sughrue, Rothwell, Mion, Zinn & Macpeak

[57] ABSTRACT

A pressure-sensitive adhesive composition comprising a liquid diene polymer containing in the molecule thereof an average of about 2.0 to about 2.5 functional groups capable of reacting with an isocyanate group, an isocyanate compound containing in the molecule thereof 2 or more isocyanate groups and a tackifier containing therein at least one polar group selected from the class consisting of —COOH, —OH, and —CH$_2$OH, wherein the isocyanate compound is present in such amount that the isocyanate group(s) of the isocyanate compound is/are present in an amount of about 0.75 to about 1.2 equivalents per equivalent of the functional groups of the liquid diene based polymer, and the tackifier is present in an amount of about 10 to about 70, preferably 30 to 60, parts by weight per 100 parts by weight of the total weight of the liquid diene polymer and the isocyanate compound. This pressure-sensitive adhesive composition is coated on a support and heated to produce a pressure-sensitive layer, whereby a pressure-sensitive adhesive tape, for example, can be obtained.

11 Claims, No Drawings

PRESSURE-SENSITIVE ADHESIVE COMPOSITION

BACKGROUND OF THE INVENTION

1. Field of the Invention

The present invention relates to a pressure-sensitive adhesive composition which can be used for the production of a pressure-sensitive adhesive tape, sheet, label, etc., and in which no or substantially no organic solvent is used. More particularly, the present invention is concerned with a pressure-sensitive adhesive composition comprising a liquid diene polymer containing one functional group at each end (terminal) thereof, an isocyanate compound containing 2 or more isocyanate groups capable of reacting with the above functional groups, thereby increasing the molecular weight of the composition, i.e., a polymerization reaction, and a tackifier containing therein at least one polar group selected from the class consisting of —COOH, —OH, and —CH$_2$OH, which forms a uniform adhesive layer.

2. Description of the Prior Art

Hitherto, a method in which a mixture prepared by adding appropriate agents such as a tackifier, a softening agent, a plasticizer, a pigment, etc., to a rubber based or acrylic based polymer, is dissolved in an organic solvent, the resulting pressure-sensitive solution containing about 30 weight% solids is coated on a support such as a plastic sheet, metal foil, etc., at a definite thickness, and then the organic solvent is evaporated in a heating-drying step, thereby re-forming an adhesive of the above mixture on the support in layer form, has been most widely employed to produce pressure-sensitive adhesive tapes, etc.

In accordance with such a method, however, two or more times as much organic solvent as solids is required for dissolving the solids of the adhesive and forming an adhesive layer. The organic solvent used, however, does not play any role in increasing the pressure-sensitive adhesive properties of the adhesive tape. This method, therefore, suffers from the defect that the use of a large amount of organic solvent requires a heat source, apparatus for evaporating the organic solvent, and apparatus for recovering the organic solvent, thereby increasing the cost of the product.

The inventors studied compositions capable of forming a pressure-sensitive adhesive layer on a support without using a solvent, such as a liquid composition comprising: (A) a liquid diene polymer containing functional groups at both ends thereof which is fluid at room temperatures; (B) an isocyanate compound capable of reacting with the liquid diene polymer to produce a rubber-like polymer; and (C) a tackifier. As a result, it has now been found that in converting this composition on the support into an adhesive layer having uniform thickness and uniform properties by polymerization, the composition must be capable of forming a completely miscible, uniform layer, and that the kind of tackifier and the amount of the tackifier play great roles in providing a completely miscible, uniform layer.

The term "uniform layer" as used herein has an important meaning in the present invention. In prior art methods of producing a pressure-sensitive adhesive using an organic solvent, solvents having a high solvating action were naturally used so as to satisfy such uniformity requirements, and the obtaining of a uniform layer was a problem overcome in reaching the present invention using no organic solvent.

The reasons why the composition of the present invention should be capable of forming a completely miscible uniform layer, i.e., a layer where there are substantially no heterogeneous portions or spots in the layer when the composition is coated on a support, will be hereinafter explained.

Firstly, when a liquid composition comprising the above three components is coated on a support at a definite thickness and heated to accelerate reaction, the viscosity of the coating layer decreases extremely (for example, 20 cps at 120° C) and is liable to flow. This is because the liquid diene polymer, a major component of the composition, has a relatively low molecular weight as described hereinafter. As a result, if there are present heterogeneous portions or spots, the heterogeneous portions or spots nucleate, thereby causing the phenomenon of voids (free of tackifier) caused by the heterogeneous portions or spots repelling the composition, or the reaction is retarded, thereby causing flow near the nuclei, and thus when the reaction is completed, areas where no adhesive layer is present and areas where the adhesive layer is especially thick are produced. Therefore, only pressure-sensitive tapes which do not have a uniform adhesive layer thickness and which are poor in appearance are obtained. Furthermore, the adhesive strength, the most important property thereof, is extremely low as the contact area between the adhesive layer and the surface to which the tape is to be stuck is low.

Secondly, where the coating layer is non-uniform, even if the components are completely miscible, the polymerization of the liquid diene polymer and the isocyanate compound does not proceed uniformly, i.e., at certain areas of the adhesive layer the reaction proceeds excessively whereas at other areas the reaction proceeds insufficiently, thereby causing stringing, which results in adhesive remaining on the surface to which the tape was struck if the tape is peeled off. A satisfactory pressure-sensitive adhesive tape cannot be obtained in such a manner.

SUMMARY OF THE INVENTION

As a result of the inventor' research on compositions capable of forming a uniform layer, based on a consideration of the results described above, it has been found that if a tackifier containing at least one polar group selected from the class consisting of —COOH, —OH, and —CH$_2$OH is added in an amount of about 70 parts by weight or less per 100 parts by weight of the total weight of the liquid diene polymer and isocyanate compound, taking into account the fact that the isocyanate compound, a chain extender of the liquid diene based polymer, contains highly polar —NCO groups, a completely miscible, uniform layer can be obtained, and, furthermore, the adhesive layer after the polymerization is uniform in thickness, has good adhesive strength, cohesive force and surface properties such as smoothness.

The present invention thus provides a pressure-sensitive adhesive composition comprising a liquid diene polymer containing in the molecule thereof an average of about 2.0 to about 2.5 functional groups capable of reacting with an isocyanate group, an isocyanate compound containing in the molecule thereof 2 or more isocyanate groups, and a tackifier containing in the molecule thereof at least one polar group selected from the class consisting of —COOH, —OH, and —CH$_2$OH, wherein the isocyanate compound is present in such as amount that the isocyanate group of the isocyanate compound is about 0.75 to about 1.2 equivalents per equivalent of the functional groups of the liquid diene polymer (about 0.75 to about 1.2 molar equivalents of the isocyanate compound per mol of the functional groups of the liquid diene polymer), and the tackifier is present in an amount of about 10 to about 70, preferably 30 to 60, parts by weight per 100 parts by weight of the total weight of the liquid diene polymer and the isocyanate compound.

The liquid diene polymer and the isocyanate compound are reacted in the presence of the tackifier to produce a pressure-sensitive adhesive.

DETAILED DESCRIPTION OF THE INVENTION

The liquid diene polymers used herein contain an average of about 2.0 to 2.5 functional groups capable of reacting with an isocyanate group (preferably at both ends thereof), and are polymers having a relatively low molecular weight of about 1,000 to about 50,000 and are liquid at room temperature.

The liquid diene polymers are homopolymers of diene monomers such as butadiene, isoprene, chloroprene, etc., or copolymers of the above diene monomers and a vinyl monomer copolymerizable with the diene monomers such as styrene, acrylonitrile, etc., where the vinyl monomer is generally present in an amount of about 5 to about 40% by weight based on the total weight of diene polymer, containing, at both ends of the polymer, or in some cases, in the polymer chain (there are always two terminal functional groups but occasionally a functional group may be present in the polymer chain), functional groups capable of reacting with the isocyanate group, such as —OH, —CH$_2$OH, —COOH, —NH$_2$, —SH, etc. Suitable liquid diene polymers on the market are poly B-D-R-45M, CS-15 and CN-15, produced by Arco Chemical Co., Hycar HTB, MTB, CHB and CTB-X produced by B.F. Goodrich Chemical Co., Nisso PB-G and PB-C produced by Nippon Soda Co., Ltd., Telagen HT Prim and CT produced by General Tire & Rubber Co., Butarez HT and CTL produced by Phillips Petroleum Co., etc. These liquid diene polymers can be used alone or as combinations thereof, depending upon the characteristics desired in the pressure-sensitive adhesive.

Preferred liquid diene polymers include the following materials:

| | Average Number of Functional Groups | Content of Vinyl Monomer | M.W. |
|---|---|---|---|
| Poly B-D-CS-15 | ca. 2.3 | Styrene ca. 25% by weight | ca. 3,600 |
| Poly B-D-CN-15 | ca. 2.5 | Acrylonitrile ca. 15% by weight | ca. 5,500 |
| Poly B-D-R-45M | ca. 2.3 | None | ca. 3,000 |
| Nisso PB-C | ca. 2.15 | None | ca. 1,500 |

The isocyanate compound used herein is a compound which reacts with the functional groups of the above liquid diene polymer, thereby causing polymerization and, furthermore, cross-linking. While the kind of isocyanate compound changes the characteristics of the adhesive tape, those polyisocyanates containing two or more isocyanate groups in the molecule are used to cause polymerization and cross-linking.

The isocyanate compounds include diisocyanates such as p-phenylenediisocyanate, 2,4-tolylenediisocyanate, 1,5-naphthalenediisocyanate, 4,4'-diphenylmethanediisocyanate, 4,4'-diphenylether diisocyanate, hexamethylene diisocyanate, cyclohexane 1,4-diisocyanate, and the like; tri or diisocyanate compounds produced from the above diisocyanate compounds and polyhydroxy compounds such as glycerin, trimethylol propane, polyether glycols and polyster glycols, both preferably of a molecular weight of about 600 to about 2,700, and the like, with the urethane bond interposed therebetween, such as Coronate 4099 and 4095, having molecular weights of 1,050 and 1,400, respectively, produced by Nippon Polyurethane Industry Co., Ltd., Takenate C-1150 produced by Takeda Chemical Industries Ltd.; polyisocyanates such as triphenylmethane triisocyanate, polymethylenepolyphenyl isocyanate, and the like, preferably having a molecular weight of about 100 to about 3,000; and in addition, blocked polyisocyanates produced by reacting the isocyanate groups of such isocyanate compounds with an ROH compound (R is an aromatic, alicyclic, or aliphatic monovalent group).

The amount of the isocyanate compound added is changed depending upon the characteristics desired for the pressure-sensitive adhesive. In general, the addition of the isocyanate compound in a proportion corresponding to about 0.75 to about 1.2 equivalents of the isocyanate group per equivalent of the functional groups of the liquid diene polymer yields good results. Below about 0.75 equivalent, polymerization proceeds insufficiently, and unreacted liquid diene polymers remain, thereby causing adhesive to remain on the object to which the tape was stuck if the tape is peeled therefrom. On the other hand, above about 1.2 equivalents, the cross-linking reaction proceeds excessively, thereby resulting in a reduction in tackiness and adhesive strength, and thus satisfactory characteristics cannot be obtained.

The tackifier used herein plays an important role in providing a completely miscible, uniform layer, and the kind of tackifier and the amount of tackifier added have, as explained hereinafter, significant meanings.

In general, in prior art pressure-sensitive adhesive solutions in which an organic solvent is used, the kind of tackifier can be relatively freely selected taking into account only the characteristics of the pressure-sensitive adhesive, and the amount of the tackifier is relatively large, e.g., usually 80 to 200 parts by weight per 100 parts by weight of the rubber component (natural rubber or synthetic rubber).

However, in the pressure-sensitive adhesive composition of the present invention, no or substantially no organic solvent is used. Therefore, ingredients constituting the composition of the present invention should be completely mutually soluble without using a solvent. Tackifier as used herein, therefore, should meet the above requirements. Thus, they are limited to those compounds containing therein at least one polar group selected from the class consisting of —CH$_2$OH, —OH, and —COOH, such as an alkyl phenol resin, a terpene phenol resin, a xylene-formaldehyde resin, rosin, hydrogenated rosin, and the like, in view of compatibility with the liquid diene polymer and the isocyanate compound. The reason for this is that a tackifier containing these polar groups is mutually miscible with the isocyanate compound which contains highly polar isocyanate groups (the chain extender), and, further, the tackifier is mutually miscible with the liquid diene polymer, thereby contributing to the formmation of a uniform composition.

The tackifiers employed in this invention preferably have a molecular weight range of about 200 to about 1,500, a softening point of about 5° to about 150° C and are semi-solid or solid at room temperature.

Most preferred alkyl phenol resins are those with 1 to 18, preferably 4, carbon atoms in the alkyl moiety thereof. Highly preferred tackifiers are as follows:

|  | M.W. | No. of functional group(s) |
|---|---|---|
| alkyl phenol resins | ca. 800 – ca. 1,300 | 2 – 5 |
| terpene phenol resins | ca. 500 – ca. 1,000 | 3 – 6 |
| xylene-formaldehyde resins | ca. 800 – ca. 1,200 | 2 – 5 |
| rosins | ca. 500 – ca. 700 | 1 – 2 |
| hydrogenated rosins | ca. 500 – ca. 700 | 1 – 2 |

The amount of the tackifier containing the above described polar groups should be controlled so that the tackifier forms a uniform layer together with the liquid diene polymer and the isocyanate compound and that the reaction between the tackifier and the isocyanate compound does not proceed predominantly i.e., the tackifier is added in an amount of about 70 parts by weight or less, preferably in an amount of about 70 to about 10, and most preferably 30 to 60, parts by weight per 100 parts by weight of the total weight of the liquid diene polymer and the isocyanate compound. Where the amount of the tackifier is below 10 parts by weight, the pressure-sensitive adhesive produced by polymerization is liable to have insufficient tackiness and adhesive strength. On the other hand, where the amount of the tackifier is above about 70 parts by weight, pressure-sensitive adhesives are obtained which are unsatisfactory in properties such as stringing of the adhesive layer, transfer of the adhesive layer to the object to which the tape is stuck, cohesive force, adhesive strength, etc.

The reason for this is that while the tackifier of the present invention contains any one of a methylol group, a carboxyl group or a hydroxy group, and is highly miscible with the other components, if the tackifier is added in an amount of above about 70 parts by weight, the reaction between these polar groups and the isocyanate compound becomes of importance, and unreacted liquid diene polymer remains, as a result of which the reactionn stops before the polymerization proceeds sufficiently.

In addition, further research revealed that as long as the tackifier having the above polar groups are especially excellent in miscibility, a part of the tackifier (not more than about 60% by weight of the tackifier) can be replaced by a non-polar tackifier such as an aliphatic hydrocarbon resin, an aromatic petroleum resin, a cumarone resin, and a polyterpene based resin, at proportions so that a uniform layer can be produced, i.e., they can be used in combination with each other. In this case, however, the total weight of all tackifiers should not exceed about 70 parts by weight per 100 parts weight of the liquid diene polymer and the isocyanate compound.

In the present invention, a catalyst can be used in order to accelerate the reaction between the liquid diene polymer and the isocyanate compound. Suitable catalysts are organic metal salts such as dibutyl tin dilaurate, diocytl tin dilaurate, tin octenate, cobalt naphthenate, and the like; amines such as N,N,N', N' -tetraethylmethanediamine, 1,4-aza- (2,2,2) bicyclooctane, and the like; and organic acids such as para-toluene sulfonic acid, and the like.

The catalyst is added in an amount of about 0.01 to about 5.0 parts by weight per 100 parts by weight of the liquid diene polymer. Where the amount is below about 0.01 part by weight, the acceleration effect thereof is poor, whereas if the amount is above about 5.0 parts by weight, the reaction proceeds at room temperature, the viscosity of the composition increases markedly, and uniform coating of the composition on the support becomes difficult.

Furthermore, the composition of the present invention can obtain, if desired, conventional additives for pressure-sensitive adhesives such as a plasticizer or softening agent such as dioctyl phthalate, dibutyl phthalate, polypropylene glycol, polyisobutylene, lanolin, surface active agents, and the like, or conventional compounding agents such an antioxidant, an ultraviolet ray absorbent, a pigment, a non-pigmenting filler, and the like. In the case where the compounding agents and starting materials are solid they can be dissolved in a small amount of an organic solvent prior to addition to the adhesive in order to produce a uniform layer.

While the present invention is, as described above, concerned with the pressure-sensitive adhesive composition, a method of producing an adhesive tape using this composition will be hereinafter explained. Initially, a predetermined tackifier, and optional compounding agents such as a plasticizer, a catalyst, if desired, and the like are added to the liquid diene polymer, and the resulting mixture is uniformly mixed by the use of a conventional rubber dissolving mixer such as a Banbury mixer, a kneader, etc. It is preferred that the isocyanate compound be added immediately before the resulting composition is to be coated on the support. When the amount of the mixture is small, the ingredients can be mixed as a batch. However, in the case of a large amount of the mixture, it is preferred that a multi-liquid continuous mixer such as is used in molding urethane foamed materials be used. This is because if a large amount of ingredients are mixed at the same time, the viscosity of the mixed composition increases during coating operation, and thus, the coating becomes difficult.

The mixed composition is then coated on a support such as paper, cellophane, a plastic sheet, metal foil, etc., directly or with an undercoating layer interposed therebetween, using a conventional coating means such as a reverse coater, a kiss coater, a knife coater, an extruder, etc., and then introduced into a heating means such as a hot air furnace. In general, upon reaction of the coating layer at about 100° to about 180° C for about 40 seconds to about 5 minutes, the coating layer on the support is substantially completely reacted, whereby a pressure-sensitive adhesive layer free of fluidity, stringing, and transfer of the adhesive to the roll, results.

Subsequently, the thus obtained product can be wound up in the form of roll and slit, or slit after being stored at a temperature of not more than 60° C, whereby a pressure-sensitive adhesive tape is obtained.

The present invention will be explained in detail by reference to the following examples, From the following examples, it will be understood that the kind and amount of tackifier play significant roles in providing a pressure-sensitive adhesive composition capable of forming a completely miscible, uniform layer. All parts are by weight, unless otherwise stated.

EXAMPLE I

To 50 parts of a liquid diene polymer containing an —OH group at each end of an acrylonitrile-butadiene copolymer and having an average molecular weight of 4,500 (produced by Arco Chemical Co. under the trade name poly B-D-CN-15), and 40 parts of a liquid diene polymer containing —OH groups on both ends (polybutadiene having an average molecular weight of 3,000; produced by Arco Chemical Co. under the trade name Poly B-D-R 45 M) were added 50 parts or 80 parts of the tackifiers shown in Table 1. The resulting mixture was uniformly mixed at room temperature in a kneader, and during kneading 0.01 part of dioctyl tin dilaurate, 1 part of an antioxidant (produced by Allied Chemical Co. under the trade name Antioxidant) and 10 parts of diphenylmethane diisocyanate were added to produce a composition. The compositions were coated on a 150 $\mu$ thick plasticized polyvinyl chloride sheet at a thickness of 30 to 40 $\mu$ (dry thickness) with a reverse coater, and the assembly heated in a heating oven maintained at 140° C for 1.5 minutes and then wound up in the form of roll to produce samples.

THe properties of the compositions so produced and the characteristics of the pressure-sensitive adhesive tape produced from the compositions were measured as follows. The results obtained are shown in Table 1.

EVALUATION OF COMPATIBILITY

A certain amount of the composition (1 g) was placed on a clean, transparent glass plate, allowed to stand at constant temperature at 40° C for 12 hours, and thereafter observed with the naked eye and a microscope (20 magnification) while irradiating light on the glass plate from below. With regard to miscibility, the following three grades were formed.

o: Completely transparent, uniform layer $\Delta$ : Dotted with spots of a diameter of 0.2 mm or less x: Spots of a diameter of 0.2 mm or less present on the whole surface, or spots of a diameter of 0.2 mm or more present

PROGRESS OF THE POLYMERIZATION REACTION

This test was conducted to evaluate to what extent the coating layer coated on the support undergoes polymerization upon heating, and if the coating layer was satisfactorily converted into a pressure-sensitive adhesive layer: The adhesive was pressed with a finger to see if it stuck to the finger, a sample was stuck onto a stainless steel plate and peeled off to see if any adhesive remained on the stainless steel plate.

The following grades were formed.

o: Polymerization proceeded sufficiently so that no adhesive remains on the finger or on the stainless steel plate.

$\Delta$ : Adhesive somewhat remained on the finger or on the stainless steel plate x: Polymerization proceeded insufficiently, so that the adhesive remained on the finger or on the stainless steel plate, or stringing of the adhesive layer occurred.

STATE OF THE ADHESIVE LAYER

The adhesive layer ws judged with the naked eye to see if the adhesive layer was formed on the support at a uniform thickness or evenly, or if particle-like unevenness (voids caused by heterogeneous portions repelling) were formed on the adhesive layer.

o: Adhesive layer whose total surface is smooth and having a uniform thickness $\Delta$ : 10 or less voids of a diameter of 2 mm or less present per square meter x: More than 10 voids of a diameter of 2 mm of less present per square meter or voids of a diameter of more than 2 mm present

ADHESIVE STRENGTH

The sample was slit to 20 mm widths and stuck onto a stainless steel plate having a mirror surface, pressed by applying a load of 2 kg with a roll and peeled off at a peeling rate of 300 mm/min with a force parallel to the stainless steel plate. The 180° peeling force at this time was measured at a temperature of 20° C with a Tensilon Measurer produced by Toyo Measuring Instrument Co., Ltd.

COHESIVE FORCE

This term designates the holding power of the pressure-sensitive adhesive tape. The sample was slit to a definite area (1 × 2 cm) and stuck to Bakelite plate. While mounted vertically and being pressed with a load of 1 kg with a roll, a 300 g weight was hung from the tape parallel to the support at 20° C for 1 hour, and then the length of deviation of the sample was measured. Of course, a sample whose length of deviation was small had high holding power and is considered an excellent pressure-senitive adhesive tape.

TABLE 1

| Run No. | Tackifier Type | Tackifier Trade Name | Molecular Weight | Average No. of Functional Groups in the Tackifier | Amount (parts) | Compatibility | Progress of the Polymerization | State of the Adhesive Layer | Adhesive Strength (g/20mm width) | Cohesive* Force (mm/hr) |
|---|---|---|---|---|---|---|---|---|---|---|
| 1a | Alkyl phenol Resin | Tamanol-526 (1) | ca. 1,000 | 3 | 50 | o | o | o | 430 | 0.25 |
| 1b | " | " | " | " | 80 | x | x | $\Delta$ | Impossible to measure (cohesion failure) | Dropped in 1 min |
| 2a | Terpene phenol Resin | T-115 (2) | ca. 700 | 4.5 | 50 | o | o | o | 520 | 0.64 |
| 2b | " | " | " | " | 80 | o | x | x | 280 | Dropped in |

TABLE 1-continued

| Run No. | Tackifier Type | Tackifier Trade Name | Molecular Weight | Average No. of Functional Groups in the Tackifier | Amount (parts) | Compatibility | Progress of the Polymerization | State of the Adhesive Layer | Adhesive Strength (g/20mm width) | Cohesive* Force (mm/hr) |
|---|---|---|---|---|---|---|---|---|---|---|
| 3a | Rosin | Estergum H (3) | ca. 600 | 1.5 | 50 | o | o | o | 430 | 5 min. 0.80 |
| 3b | " | " | " | " | 80 | × | Δ Stringing | o | 300 | Dropped in 7 min. |
| 4a | Xylene-formaldehyde Resin | Nikanol H (4) | ca. 1,000 | 3.5 | 50 | Δ - o | o | o | 390 | 0.74 |
| 4b | Xylene-formaldehyde Resin | Nikanol H (4) | ca. 1,000 | — | 80 | × | × | × | Impossible to measure (cohesion failure) | Dropped in 1 min |
| 5 | Same as 1a | Tamanol-526 | | — | 25 combined with | o - Δ | o | Δ - o | 470 | 0.82 |
|  | Terpene Resin | Piccolyte A-115 | | — | 25 | | | | | |
| 6 | Same as 2a | T-115 | | — | 25 combined with | o | o | o | 490 | 0.15 |
|  | Same as 8a | Hiresin 60 | | — | 25 | | | | | |
| 7a | Aliphatic Petroleum Resin | Hiretz (5) | ca. 1,000 | — | 50 | × | Δ | × | 600 | 5.9 |
| 7b | " | C-110 X | " | — | 80 | × | × | × | Impossible to measure (cohesion failure) | Dropped immediately |
| 8a | Aromatic Petroleum Resin | Hiresin 60 (6) | ca. 700 | — | 50 | × | × | × | 520 | 12.0 |
| 8b | Aromatic Petroleum Resin | Hiresin 60 (6) | ca. 700 | — | 80 | × | × | × | Impossible to measure (cohesion failure) | Dropped immediately |
| 9a | Cumarone Resin | Cumarone BM (7) | ca. 650 | — | 50 | × | Δ stringing | Δ | 620 | 2.90 |
| 9b | " | " | | — | 80 | × | × | × | Impossible to measure | Dropped in 40 sec. |
| 10a | Terpene Resin | Piccolyte A-115 (8) | ca. 1,000 | — | 50 | Δ | Δ - o | Δ | 280 | 7.5 |
| 10b | " | " | " | — | 80 | × | Δ stringing | × | 520 | 12.3 |
| 11a | Terpene Resin | YS Resin 115 (9) | ca. 1,000 | — | 50 | × | Δ | × | 210 | 15.0 |
| 11b | " | " | " | — | 80 | × | × | × | Impossible to measure (cohesion failure) | Dropped immediately |

*The figures represent the distance the sample moved down along the surface to which the sample was stuck in one hour.

SUPPLIERS OF TACKIFIERS

1. Arakawa Rinsan Kagaku Kogyo Co., Ltd.
2. Yasuhara Yushi Kogyo C., Ltd.
3. Arakawa Rinsan Kagaku Kogyo Co., Ltd.
4. Mitsubishi Gas Chemical Industries, Ltd.
5. Mitsui Petrochemical Industries, Ltd.
6. Toho Petroleum Resin Co., Ltd.
7. Nippon Steel Corp.
8. Pennsylvania Industrial Chemical Corp.
9. Yasuhara Yushi Kogyo Co., Ltd.

In Runs 1 a, 2 a, 3 a, and 4 a of Table 1, an alkylphenol resin (containing —OH and —CH₂OH groups), a terpene phenol resin (containing —OH and —CH₂OH groups), rosin (containing —COOH groups), and a xylene-formaldehyde resin (containing —CH₂OH groups) were added as tackifiers in an amount of 50 parts per 100 parts of the total weight of the liquid diene polymer and the isocyanate compound. In Runs 5 and 6, these polar group-containing tackifiers and nonpolar tackifiers were used in combination with each other.

In these cases, as is apparent from the results shown in Table 1, compatibility, progress of the polymerization, and state of the adhesive layer were all good, and, furthermore, the adhesive strength and cohesive force of the pressure-sensitive layer were good. Thus, they are suitable examples of the present invention.

On the other hand, in Runs 1 b, 2 b, 3 b, and 4 b, polar group-containing tackifiers were added in an amount of 80 parts per 100 parts of the total weight of the liquid diene polymer and the isocyanate compound. Therefore, compatibility, progress of the polymerization, and state of the adhesive layer were poor. In particular, the polymerization proceeded insufficiently to such an extent that the adhesive remained on the finger and the stainless steel plate, or the polymerization stopped in the state of stringing, and thus the desired adhesive layer could not be obtained.

In Runs 7 a and 7 b, 8 a and 8 b, 9 a and 9 b, 10 a and 10 b, and 11 a and 11 b, a non-polar tackifier such as an aliphatic petroleum resin, an arommatic petroleum resin, a cumarone resin, or a terpene resin, was added in an amount of 50 parts or 80 parts per 100 parts of the total weight of the liquid diene polymer and the isocyanate compound. In each case, compatibility was poor, the polymerization reaction did not proceed uniformly, unevenness (voids) of the adhesive layer was marked, and stringing occurred in the layer. Therefore, the adhesive layer was liable to cause cohesive failure and the holding power was poor.

EXAMPLE 2

To 75 parts of a liquid diene polymer containing —OH groups at both ends of a styrene-butadiene copolymer (average molecular weight of 3,600; trade name, Poly B-D CS-15), 25 parts of a polyether diisocyanate (trade name Coronate 4099; produced by Nippon Polyurethane Industries Co., Ltd.) and 0.5 part of tin octylate was added, as a tackifier, a 90% suitably used as a surface protective material for a stainless steel plate, a decorative sheet, etc. On the other hand, if the amount of the tackifier added was above about 70 parts per 100 parts of the total weight of the liquid diene polymer and the isocyanate compound, the polymerization reaction proceeded insufficiently, and thus adhesive remained on the finger or stainless steel plate or stringing occurred which resulted in a marked reduction of cohesive force.

Furthermore, where the non-polar aromatic petroleum resin was used, a uniform adhesive layer could not be obtained irrespective of the amount of the petroleum resin added. Moreover, adhesive strength and cohesive force were both low, and thus good properties as a pressure-sensitive adhesive tape could not be obtained.

TABLE 2

| Type of Tackifier | Amount (parts) | Compatibility | Progress of the Polymerization | State of the Adhesive Layer | Adhesive Strength (g/20 mm width) | Cohesive Force* (mm/hr) |
|---|---|---|---|---|---|---|
| Terpene phenol Resin (trade name: T-115, produced by Yasuhara Yushi Kogyo Co., Ltd.) | 10 | o | o | o | 220 | 0.01 |
| | 20 | o | o | o | 350 | 0.21 |
| | 50 | o | o | o | 400 | 0.57 |
| | 70 | o | o - Δ | o | 530 | 0.89 |
| | 90 | o | × | o | 400 | Dropped in 8 min. |
| | 120 | Δ | × | × | Impossible to measure | Dropped immediately |
| | 150 | Δ | × | × | Same as above | Same as above |
| Xylene-formaldehyde Resin (trade name: Nikanol H, produced by Mitsubishi Gas Chemical Ind.) | 10 | o | o | o | 120 | No deviation |
| | 20 | o | o | o | 300 | 0.05 |
| | 50 | o | o | o | 520 | 0.35 |
| | 70 | o - Δ | Δ | o - Δ | 640 | 1.00 |
| | 90 | × | × | × | Impossible to measure | Dropped in 25 min. |
| | 120 | × | × | × | Same as above | Dropped immediately |
| | 150 | × | × | × | Same as above | Same as above |
| Aromatic Petroleum Resin (trade name: Hiresin 60, produced by Toho Petroleum Resin Co., Ltd.) | 10 | Δ | o | Δ | 110 | 0.53 |
| | 20 | Δ | Δ Stringing | × | 290 | 3.50 |
| | 50 | × | Δ Stringing | × | 300 | 5.37 |
| | 70 | × | Δ Stringing | × | 400 | Dropped in 30 min. |
| | 90 | × | × | × | 310 | Dropped in 27 min. |
| | 120 | × | × | × | 270 | Dropped immediately |

*The figures represent the distance the sample moved down along the surface to which the sample was stuck in an hour.

toluene solution of a terpene phenol resin, a xylene-formaldehyde resin, or an aromatic petroleum resin in an amount as shown in Table 2 to produce various kinds of compositions. These compositions were coated on a 150 μ thick plasticized polyvinyl chloride sheet (produced by Mitsubishi Monsanto Co., Ltd.) at a thickness of about 30 μ (dry basis) and heated at 130° C for 5 minutes to produce samples.

The properties of the above compositions and the characteristics of the samples as a pressure-sensitive adhesive tape were evaluated in the same manner as was used in Example 1.

The results obtained are shown in Table 2. As can be seen from Table 2, the addition of the polar group-containing terpene resin and xylene-formaldehyde resin in amounts ranging fromm 20 parts to 70 parts per 100 parts of the total weight of the liquid diene polymer and the isocyanate compound provided pressure-sensitive adhesive tapes having good properties. Where the tackifier was added in an amount of 10 parts per 100 parts of the total weight of the liquid diene polymer and the isocyanate compound, adhesive strength was poor but cohesive force was increased. Thus, a composition produced by adding the tackifier in such an amount is

EXAMPLE 3

In this example, the pressure-sensitive adhesive compositions of the present invention was coated on various supports to produce pressure-sensitive adhesive tapes. The properties of the thus obtained tapes and those of articles produced using a prior art organic solvent-type pressure-sensitive adhesive solution were compared.

85 parts of a liquid diene polymer (polybutadiene containing —COOH groups at both ends thereof and having an average molecular weight of 1,500, produced by Nippon Soda Co. under the trade name Nisso PB-C), 45 parts of an alkyl phenol resin (produced by Arakawa Rinsan Kagaku Kogyo Co., Ltd. under the trade name of Tamanol 526) and 0.25 part of cobalt naphthenate were mixed in a kneader. Then, 15 parts of polymethylenepolyphenylisocyanate (produced by Nippon Polyurethane Co., Ltd. under the trade name Mirionate MR) was added thereto and the system uniformly mixed. The composition produced was coated on a 25 μ thick polyethylene terephthalate sheet (produced by Toray Co.), a 60 μ thick polypropylene sheet (produced by Toray Co.), a 35 μ thick cellophane sheet (produced by Dainihon Cellophane Co., Ltd.), or a 35 thick kraft paper (produced by Tokai Pulp Co., weight 73 g/m²) at the thicknesses shown in Table 3 (dry basis) with a reverse coater, and the products heated at 120° C (in the case of cellophane, at 100° C) for 2 minutes. The products were then wound up in the form of roll to produce Samples, A, B, C, and D, respectively.

These samples were evaluated with regard to characteristics of the pressure-sensitive adhesive tape. The results obtained were good, as is shown in Table 3, and they were the equivalent or better than those of articles on the market. Evaluation methods were the same as were used in Example 1.

TABLE 3

| Type of Support | Sample and Product on Market | Thickness of Adhesive Layer (μ) | Adhesive Strength (g/20 mm width) | Cohesive Force* (mm/hr) |
|---|---|---|---|---|
| Polyethylene Terephthalate | Sample A | 30 | 720 | No deviation |
| | Product on Market (produced by Nitto Electric Industrial Co., Ltd., No. 31 C) | 30 | 690 | 1.2 × 10⁻² |
| Polypropylene | Sample B | 40 | 1020 | 3.5 |
| | Product on Market (produced by the same company as above, No. 375) | 40 | 950 | 5.5 |
| Cellophane | Sample C | 25 | 590 | No deviation |
| | Product on Market (produced by the same company as above, No. 29) | 25 | 630 | 0.1 × 10⁻² |
| Kraft Paper | Sample D | 45 | 820 | 1.7 |
| | Product on Market (produced by the same company as above No. 712) | 45 | 750 | 4.2 |

The figures represent the distance the sample moved down along the surface to which the sample was stuck in one hour.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition for producing a pressure-sensitive adhesive, the pressure-sensitive adhesive composition consisting essentially of a homo- or co-polymer having a molecular weight of 1,000 to 50,000 of diene monomers or a copolymer of diene monomers and a vinyl monomer and containing in the molecule thereof an average of about 2.0 to about 2.5 functional groups capable of reacting with an isocyanate group, an isocyanate compound containing therein 2 or more isocyanate groups, and a tackifier miscible with the diene polymer and the isocyanate compound containing therein at least one polar group selected from the class consisting of —COOH, —OH, and —CH₂OH, wherein the isocyanate compound is present in such amount that the isocyanate group of said isocyanate compound is about 0.75 to about 1.2 equivalents per equivalent of the functional group of the liquid diene polymer, and the tackifier is present in an amount of about 10 to about 70 parts by weight per 100 parts by weight of the total weight of the liquid diene polymer and the isocyanate compound.

2. The pressure-sensitive adhesive composition according to claim 1, wherein the liquid diene polymer contains one or more functional groups selected from the class consisting of —OH, —CH₂OH, —COOH, and —SH.

3. The pressure-sensitive adhesive composition according to claim 1, wherein the isocyanate compound is selected from the class consisting of diisocyanates, diisocyanate compounds or triisocyanate compounds produced from the diisocyanates and polyhydroxy compounds, polyisocyanates, or blocked isocyanates produced by reacting the isocyanate groups of the preceding isocyanate compounds with a compound of the formula ROH, where R is an aromatic, alicyclic or aliphatic monovalent group.

4. The pressure-sensitive adhesive composition according to claim 1, wherein the tackifier is selected from the class consisting of an alkyl phenol resin, a terpene phenol resin, a xylene-formaldehyde resin, rosin, and hydrogenated rosin.

5. The pressure-sensitive adhesive composition according in claim 1, wherein the adhesive composition further contains one or more of a plasticizer, a surface active agent, an antioxidant, and ultraviolet ray absorbent, a pigment or a non-pigmenting filler.

6. The pressure sensitive adhesive composition according to claim 1, wherein the liquid diene polymer is a homopolymer of a diene monomer selected from the group consisting of butadiene, isoprene and chlorprene.

7. The pressure sensitive adhesive composition according to claim 1, wherein the liquid diene polymer is a copolymer of one or more monomers selected from the group consisting of butadiene, isoprene and chloroprene and one or more vinyl monomers selected from the group consisting of styrene and acrylonitrile where the vinyl monomer in present in an amount of about 5 to about 40% by weight based on the total weight of diene polymer.

8. The pressure sensitive adhesive composition of claim 1 containing substantially no solvent.

9. The pressure sensitive adhesive composition of claim 1 containing no solvent.

10. The pressure sensitive adhesive composition of claim 1 wherein the tackifier has a molecular weight of about 200 to about 1500, a softening point of about 5 to about 150° C and is solid or semi-solid at room temperature.

11. The pressure sensitive adhesive composition of claim 1 wherein the isocyanate compound is selected from the group consisting of p-phenylenediisocyanate, 2,4-tolyenediisocyanate, 1,5-naphthalenediisocyanate, 4,4'-diphenylmethanediisocyanate, 4,4'-diphenylether diisocyanate, hexamethylenediisocyante and cyclohexane 1,4-diisocyanate.

* * * * *